Nov. 17, 1936.  J. D. EVANS  2,061,514
WASHING MACHINE MIXING TANK
Filed Dec. 19, 1933  3 Sheets-Sheet 3
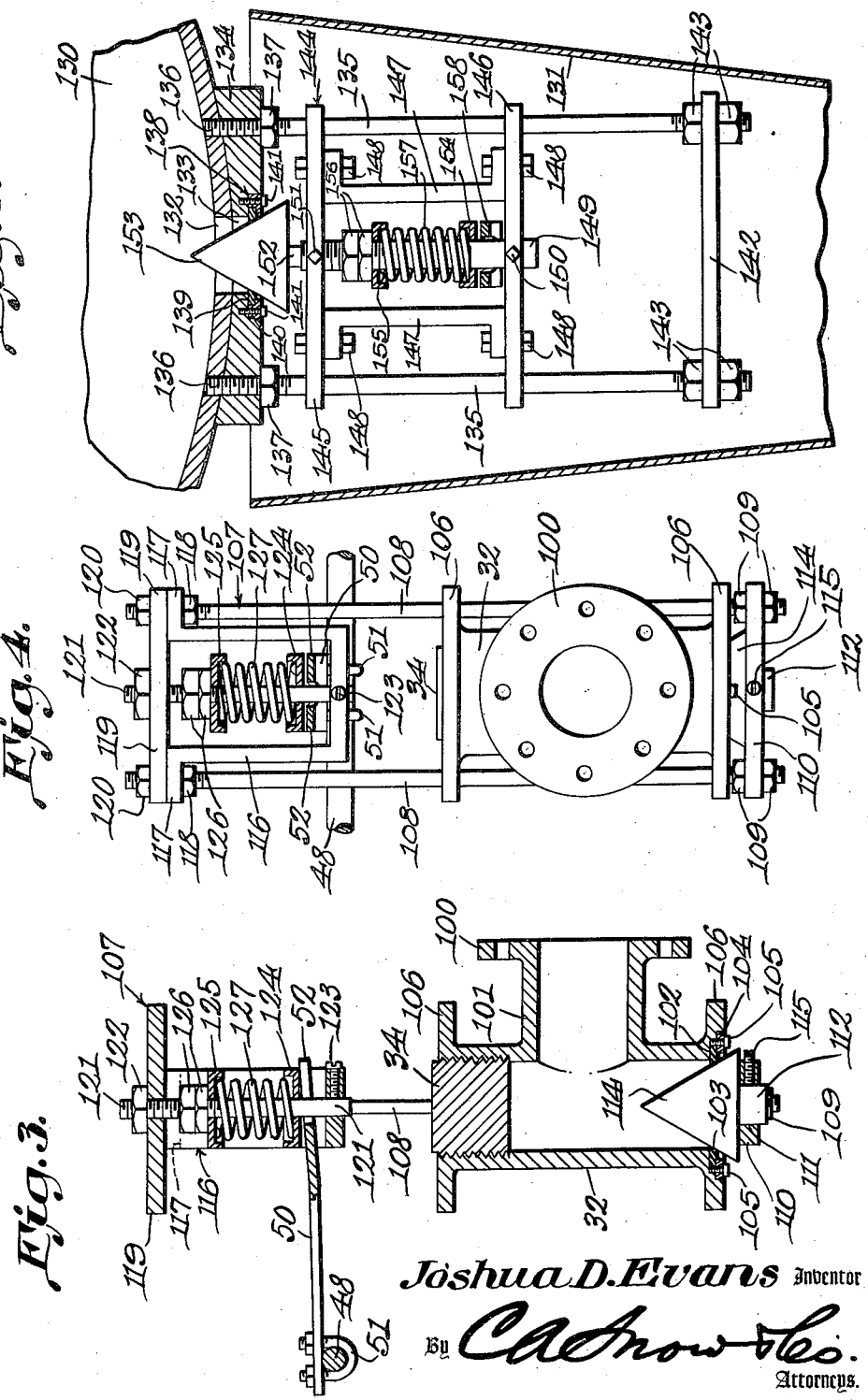
Joshua D. Evans Inventor
By C. A. Snow & Co.
Attorneys.

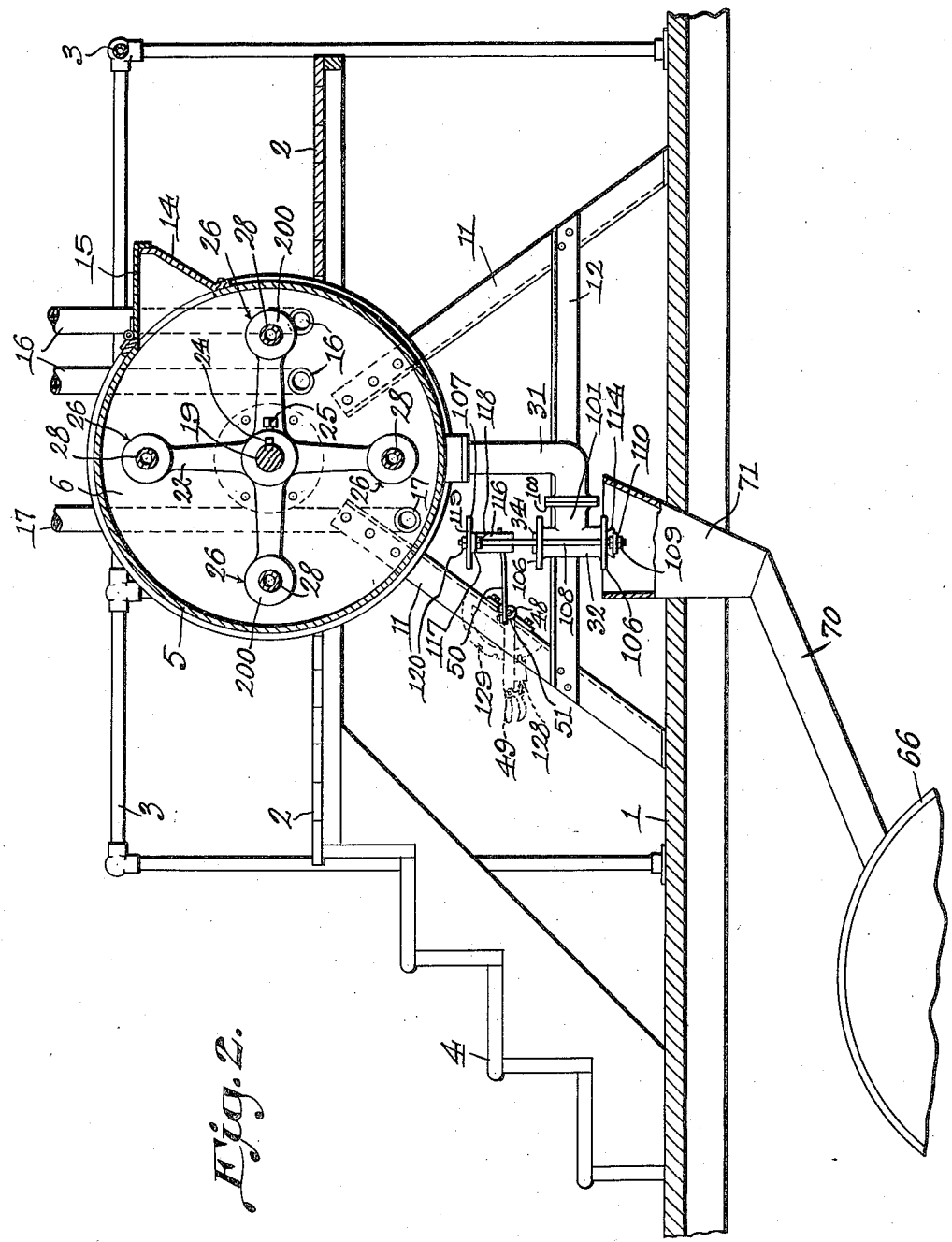

Patented Nov. 17, 1936

2,061,514

UNITED STATES PATENT OFFICE 2,061,514

WASHING MACHINE MIXING TANK

Joshua D. Evans, Berkeley, Calif., assignor of one-third to Jennie Wright, Berkeley, Calif.

Application December 19, 1933, Serial No. 703,123

1 Claim. (Cl. 259—9)

This application relates to subject matter disclosed in part in my former application No. 524,693, filed March 23, 1931, the same having matured into Patent No. 1,931,721, granted on October 24, 1933.

The device which forms the subject matter of this application is a mixer, adapted to be used primarily but not exclusively in connection with a washing machine, such as that shown in the patent above mentioned. One object of the invention is to provide novel means for producing the necessary agitation, both as to the construction of the agitator, and as to the mounting and operation thereof, another object of the invention being to provide novel means for governing the quantity of liquid discharged.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 2 is a vertical transverse section of the mixer;

Fig. 3 is a vertical longitudinal section of the controlling device;

Fig. 4 is an elevation of the structure shown in Fig. 3;

Fig. 5 is a vertical section showing a modification.

Figure 1:
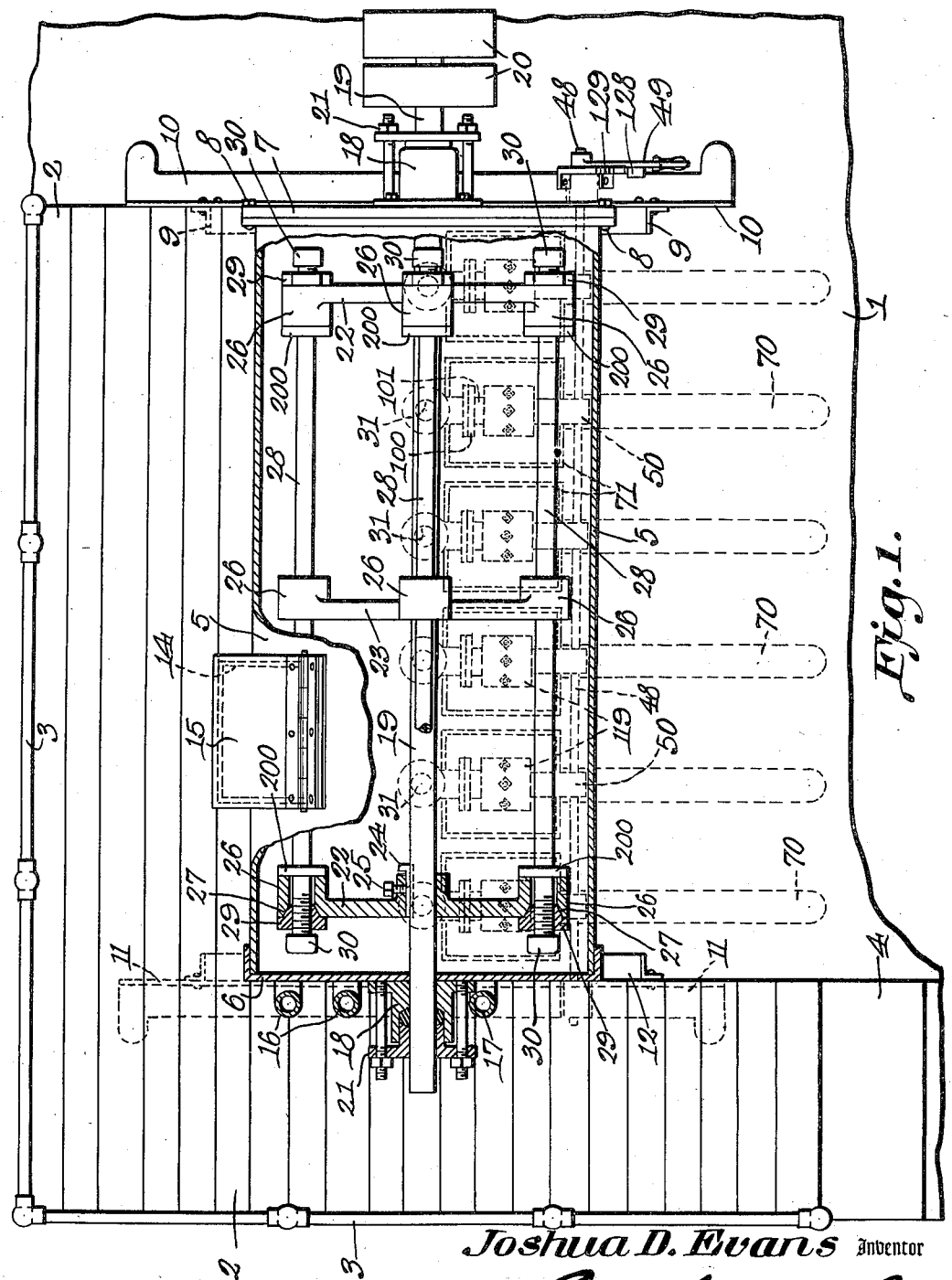
Fig. 1 shows in horizontal section, the mixer embodied in this application.

The mixer embodies a support, which may be a floor 1, carrying an elevated platform 2, about which extends a rail 3. Access is had to the platform 2 by steps 4.

A horizontal cylindrical tank 5 is provided. The mixing tank 5 extends above and below the platform 2, as shown in Fig. 2. At one end, the mixing tank 5 is provided with a fixed head 6. At its opposite end, the mixing tank is provided with a removable head 7 held in place by securing elements 8. At the last-specified end of the mixer, the tank 5 is carried by brackets 9 (Fig. 1) on a frame 10 mounted on the floor 1. The opposite end of the mixing tank 5 is supported from the floor 1 (Fig. 2) by legs 11. The legs 11 are connected by a brace 12. The tank 5 carries a hopper 14, located in convenient relation to the steps 4, near to one end of the tank 5, the hopper 14 having a lid 15.

Hot and cold water are supplied to the mixing tank 5 by pipes 16 entering the fixed head 6. Another pipe, marked by the numeral 17, opens through the head 6 of the mixing tank 5, this pipe being adapted for connection with the float control (not shown) which governs the entrance of the water by way of the pipes 16.

The heads 6 and 7 are provided with bearings 18 in which is journaled a shaft 19, which may be operated by fast and loose pulleys 20, or in any other suitable manner. Leakage about the shaft 19 is prevented by glands 21 carried by the bearings 18.

Within the mixing tank 5, the shaft 19 carries a rotatable agitator embodying end pieces 22 and an intermediate piece 23, these parts 22 and 23 comprising radial arms (Fig. 2). The members 22 and 23 of the agitator are held on the shaft 19 by keys 24, the keys being held in the hubs of the members 22 and 23 (Fig. 1) by set screws 25.

The arms of the members 22 and 23 of the agitator have lateral sockets 26 and the sockets of the members 22 are provided with tapered seats 27. The longitudinal members 28 of the agitator may be in the form of pipes, extended through the seats 27 and carrying abutment disks 200 which engage the inner ends of the sockets 26 of the end members 22. Conical nuts 29 are threaded on the longitudinal members 28 of the agitator, and cooperate with the seats 27 to hold the members 28 against longitudinal movement in the parts 22 and 23 of the agitator. The ends of the longitudinal members 28 of the agitator are closed by removable caps 30.

The bottom of the mixing tank 5 has a plurality of outlet pipes 31, each of these pipes being of rectangular form, in elevation, as shown in Fig. 2. The lower ends of the outlet pipes 31 are connected to flanges 100, on the lateral branches 101 of T-shaped couplings or conduit members 32. Closure plugs 34 are threaded into the upper ends of the couplings 32. In the lower ends of the couplings 32 there are recesses 102, receiving valve seats 103, made of rubber or any other suitable substance, the recesses receiving, also, retaining rings 104 which hold the valve seats 103 in place, the retaining rings being attached to the lower ends of the couplings 32 by securing elements 105. The couplings 32 have outstanding flanges 106 at their ends.

Vertically movable frames 107 are provided.

Each frame 107 includes rods 108 mounted to slide in the flanges 106 of the couplings 32. Nuts 109 are threaded on the lower ends of the rods 108, and retain thereon a foot plate 110 provided with a central opening 111 receiving the shank 112 of a conical valve 114 adapted to cooperate with the valve seat 103. A securing element 115 is threaded into the foot plate 110 and engages the shank 112 of the valve 114, to hold the valve 114 firmly assembled with the foot plate 110. A U-shaped yoke 116 is disposed between the upper ends of the rods 108 of the frame 107 and has outwardly extended ends 117 through which the upper portions of the rods 108 extend, the ends 117 of the yoke 116 resting on lower nuts 118 threaded on the rods 108. A top bar 119 is mounted on the upper portions of the rods 108 and rests on the ends 117 of the yoke 116. Upper nuts 120 are threaded on the rods 108 and engage the top bar 119, to hold it in place. The upper end of a stem 121 is threaded into the top bar 119. A nut 122 is threaded on the stem 121 and engages the top bar 119. The lower end of the stem 121 passes downwardly through the bottom portion of the yoke 116. A securing element 123, such as a screw, is mounted in the lower portion of the yoke 116 and engages the bottom portion of the stem 121. A lower abutment disk 124 is slidable on the stem 121. An upper abutment disk 125 is mounted on the stem 121. The upper abutment disk 125 is engaged by superposed nuts 126 threaded on the stem 121. A compression spring 127 surrounds a portion of the stem 121 and is located between the disks 124 and 125. The disks 124 and 125 have peripheral flanges for the retention of the spring 127. The effort of the spring 127 may be varied by adjusting the superposed nuts 126 upwardly and downwardly on the stem 121.

A shaft 48 extends the full length of the machine, and is carried for rocking movement on the legs 11 and on the frame 10. The shaft 48 is provided, at one end, with a handle 49, whereby the shaft may be operated. The handle 49 carries a latch mechanism 128, adapted to cooperate with a segment 129 on the frame 10, to hold the shaft 48 in any position to which it may have been rotated. The shaft 48 has a plurality of arms 50, the securing means for the arms being marked by the numeral 51. The arms 50 are supplied with forks 52 which straddle the stems or plungers 121, below the lower abutment disks 124.

The couplings or conduit members 32 discharge into funnels 71 on the upper ends of pipes 70 leading to the tank 66 of a washing machine such as that shown in my prior patent above mentioned, although the device, in use, is not confined to such a purpose.

In practical operation, the washing fluids, soap, bluing, and the like, are cast into the hopper 14 and flow into the mixing tank 5, water and other liquids entering the tank through the pipes 16 and 17. By way of the pulleys 20, or their equivalent, rotation is imparted to the shaft 19, and the shaft operates the agitator, including the parts 22, 23 and 28. The mixture is thoroughly agitated in the tank 5.

The shaft 48 is held against rotation by the engagement between the latch mechanism 128 on the handle 49 of the shaft 48 and the segment 129 on the frame 10. The spring 127 of Fig. 3 exerts a downward pressure on the lower disk 124, and the lower disk is pressed against the fork 52 of the arm 50 on the shaft 48. The spring 127 presses upwardly on the upper abutment disk 125, and the entire frame 107 is raised, so that the valve 114 is kept in engagement with the seat 103. When the operator wishes to discharge the contents of the tank 5, he rotates the shaft 48 by means of the handle 49, and the arm 50 of Fig. 3 swings downwardly. This permits the entire frame 107 to move downwardly, and the valve 114 is spaced from the valve seat 103. The liquid flows from the tank 5 through the pipe 31, and through the coupling 32 into the funnel 71 or other place of use. By reversal of the operation above described, the valve 114 may be closed, and the supply of liquid cut off, in a way which will be obvious when Fig. 3 of the drawings is examined.

In Fig. 5, the tank 130 corresponds to the tank 5, and the funnel 131 represents the funnel 71. The tank 130 has any desired number of openings 132 in its bottom. Each opening 132 is in register with an opening 133 in a base block 134 that abuts against the bottom of the tank 130. Guide rods 135 are provided. The guide rods 135 pass through the base block 134. The upper ends of the guide rods 135 are threaded at 136 into the tank 130. Nuts 137 are threaded on the guide rods 135, and engage the base block 134 to hold it in place. In the bottom of the base block 134 there is a recess 138 corresponding to the recess 102. In the recess 138 are mounted a valve seat 139, corresponding to the valve seat 103, and a retaining ring 140 for the valve seat, the retaining ring corresponding to the ring 104. The ring 140 is held in place by securing elements 141, engaging the base block 134, and corresponding to the securing elements 105. A foot plate 142 is held on the lower ends of the guide rods 135 by nuts 143.

A frame 144 is provided. The frame 144 comprises a top bar 145 and a bottom bar 146. The top bar 145 and the bottom bar 146 are mounted to reciprocate on the guide rods 135. The top bar 145 is connected to the bottom bar 146 by standards 147 attached to the top bar 145 and to the bottom bar 146 by securing elements 148. A stem or plunger 149 is disposed between the standards 147. The stem or plunger 149 passes through the top bar 145 and the bottom bar 146. The lower portion of the stem or plunger 149 is held in the bottom bar 146 by a securing element 150 mounted in the bottom bar. The upper portion of the stem or plunger 149 is held in the top bar 145 by a securing element 151. The securing elements 150 and 151 may be screws. The upper end of the stem or plunger 149 is hollow, to receive the shank 152 of a conical valve 153 which cooperates with the valve seat 139. The securing element 151 holds the shank 152 of the valve 153 assembled with the upper end of the stem or plunger 149. A lower abutment disk 154 is slidably mounted on the stem or plunger 149. The lower abutment disk 154 corresponds to the lower abutment disk 124. An upper abutment disk 155, corresponding to the abutment disk 125 is slidably mounted on the plunger 149. Superposed nuts 156 on the plunger 149 engage the upper abutment disk 155 and are employed to vary the effective pressure of a compression spring 157, corresponding to the spring 127, and located about the plunger 149, between the disks 154 and 155. The plunger 149 is straddled, below the lower abutment disk 154, by a fork 158, corresponding to the fork 52 of the arm 50 of Fig. 3.

The operation of the device shown in Fig. 5 of the drawings does not differ sufficiently from the operation of the device shown in Figs. 3 and 4 so that it need to be gone into in detail.

Broadly speaking, the chief difference is that the valve 114 of Fig. 3 closes upwardly with respect to the coupling 32, whereas the valve 153 of Fig. 5 closes upwardly with respect to the base block 134.

Having thus described the invention, what is claimed is:

In a mechanism for reducing the time that an agitator need be operated, a substantially horizontal, elongated mixing tank, means for delivering liquids of different kinds to the mixing tank, a single agitator operating in the mixing tank and substantially coextensive in length with the tank, outlets for the mixing tank, spaced apart throughout the length of the mixing tank and located on the bottom of the tank, means under the control of an operator for opening or closing all the outlets at once, a receiver, and funnels discharging into the receiver and receiving liquid from the respective outlets, the funnels being open, to permit sampling of the mixture that passes into any funnel from any outlet.

JOSHUA D. EVANS.